(12) United States Patent
Bohn et al.

(10) Patent No.: US 12,151,641 B2
(45) Date of Patent: Nov. 26, 2024

(54) BELT REEL AND ALSO BELT RETRACTOR HAVING A BELT REEL

(71) Applicant: ZF AUTOMOTIVE GERMANY GMBH, Alfdorf (DE)

(72) Inventors: Jens Bohn, Alfdorf (DE); Thomas Kielwein, Eschach (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 357 days.

(21) Appl. No.: 17/618,485

(22) PCT Filed: Jun. 16, 2020

(86) PCT No.: PCT/EP2020/066576
§ 371 (c)(1),
(2) Date: Dec. 12, 2021

(87) PCT Pub. No.: WO2020/254300
PCT Pub. Date: Dec. 24, 2020

(65) Prior Publication Data
US 2022/0234539 A1 Jul. 28, 2022

(30) Foreign Application Priority Data
Jun. 18, 2019 (DE) ..................... 10 2018 116 448.6

(51) Int. Cl.
*B60R 22/34* (2006.01)
*B60R 22/46* (2006.01)

(52) U.S. Cl.
CPC ...... *B60R 22/3413* (2013.01); *B60R 22/4604* (2013.01); *B60R 2022/3427* (2013.01)

(58) Field of Classification Search
None
See application file for complete search history.

(56) References Cited

U.S. PATENT DOCUMENTS

| 9,132,801 | B2 * | 9/2015 | Fukuhara | ................ B60R 22/34 |
| 2009/0277986 | A1 * | 11/2009 | Cordes | .................... B60R 22/34 |
| | | | | 242/379 |

(Continued)

FOREIGN PATENT DOCUMENTS

| CH | 328038 A | 2/1958 |
| DE | 102008000981 A1 | 10/2009 |

(Continued)

OTHER PUBLICATIONS

PCT International Search Report for corresponding International Application Serial No. PCT/EP2020/066576, mailed Sep. 10, 2020, pp. 1-4.

*Primary Examiner* — Michael R Mansen
*Assistant Examiner* — William Ty Sessums
(74) *Attorney, Agent, or Firm* — Tarolli, Sundheim, Covell & Tummino LLP

(57) ABSTRACT

A belt reel (14) for a belt retractor (10) has a rotational axis (R) and a reel body (16) that is provided as a reel for a webbing (24) and has a first axial circumferential circle (34). The reel body (16) further includes a radial constriction (32) having a second axial circumferential circle (36), wherein the constriction (32) is arranged centrally on the reel body (16) in the axial direction (A) and wherein the circumference of the second axial circumferential circle (36) amounts to a maximum of 95% of the circumference of the first axial circumferential circle (34). Moreover, a belt retractor (10) comprising such belt reel (14) is described.

20 Claims, 4 Drawing Sheets

(56) References Cited

U.S. PATENT DOCUMENTS

2011/0309179 A1\* 12/2011 Yanagawa ............... B60R 22/38
                                                              242/374
2012/0025001 A1    2/2012 Maekubo et al.

FOREIGN PATENT DOCUMENTS

| DE | 102011088168 A1 |   | 6/2013 |           |
|----|-----------------|---|--------|-----------|
| JP | H10129414 A     |   | 5/1998 |           |
| KR | 20030003773 A   | * | 1/2003 | ........... B60R 22/341 |
| WO | 2017/011304 A1  |   | 1/2017 |           |

\* cited by examiner

BELT REEL AND ALSO BELT RETRACTOR HAVING A BELT REEL

RELATED APPLICATIONS

This application is a U.S. National Stage Application filed under 35 USC 371 claiming priority to Serial No. PCT/EP2020/066576, filed on 16 Jun. 2020; which claims priority from German Patent Application DE 10 2018 116 448.6, filed 18 Jun. 2019, the entireties of which are hereby incorporated herein by reference.

TECHNICAL FIELD

The invention relates to a belt reel for a belt retractor, comprising a rotational axis and a reel body provided as a reel for a webbing and having a first axial circumferential circle. Moreover, the invention relates to a belt retractor comprising a belt reel.

BACKGROUND

Belt retractors comprising a belt reel are known and serve for providing a seatbelt for a vehicle occupant of an automotive vehicle. During normal operation, the vehicle occupant can freely withdraw the seatbelt from the belt reel against the action of a winding spring, and the belt reel winds up the seatbelt again, when the vehicle occupant unbuckles the seatbelt, for example. Depending on external parameters such as the deceleration of the vehicle or the rotational acceleration of the belt reel when webbing is withdrawn, the blocking mechanism by which the belt reel can be blocked within the frame is activated.

When the belt reel is blocked within the frame, no more seatbelt can be withdrawn from the belt reel, until a predefined load level is reached in the seatbelt; the belt reel does not rotate relative to the frame of the belt retractor, with the exception of minimum yielding which is due to the inherent elasticity of all components present in the flux of force.

In order to find out how a belt retractor comprising a belt reel behaves in the case of restraint such as in the case of crash, the belt reel and the belt retractor comprising the belt reel are subjected to various tests, for example to the "ECE-R16 sled test" or the "loop load test according to FMVSS 209".

SUMMARY

It is the object of the invention to provide a belt reel and a belt retractor comprising a belt reel which have improved characteristics in the case of restraint and, thus, increase the safety.

For achieving the object, a belt reel for a belt retractor is provided including a rotational axis and a reel body which is arranged as a reel for a webbing and has a first axial circumferential circle. The reel body further includes a first radial constriction with a second axial circumferential circle that is arranged centrally on the reel body in the axial direction. The circumference of the second axial circumferential circle amounts to a maximum of 95% of the circumference of the first axial circumferential circle.

In accordance with the invention, an axial circumferential circle is a circle having a radius that corresponds to the maximum radial distance of all points of the reel body from the rotational axis at the corresponding axial portion of the reel body. That is to say, the axial circumferential circle forms an envelope from which no point of the reel body protrudes at the corresponding axial portion.

The reel body is the part of the belt reel around which the webbing is wrapped at least in portions and which thus comprises the winding area to which the webbing is adjacent on the reel body.

This configuration causes the radial constriction to form a peripheral groove on the radial outer face of the reel body. In the case of load, particularly in the case of restraint, the webbing can constrict to the smaller diameter of the peripheral groove. Said constriction effectuates a reduction of the acting lever, which results in a reduction of the forward displacement in the sled test according to ECE R16 and in a reduction of the webbing extension in the loop load test according to FMVSS 209, when the same load-limiting system is used. Hence, the belt reel exhibits improved characteristics in the case of restraint, thereby improving the safety of a vehicle occupant who is protected by a safety system in such belt reel.

It is of advantage when the second axial circumferential circle is arranged centrally on the reel body in the axial direction. In this way, the webbing constricts symmetrically toward the center in the axial direction, thereby allowing the path of forces inside the webbing to be improved.

In one embodiment, the circumference of the second axial circumferential circle amounts to 80% to 95%, preferably to 85% to 90%, of the circumference of the first axial circumferential circle. Accordingly, on the one hand, the constriction is sufficiently deep to significantly reduce the acting lever, and, on the other hand, it is so flat that the webbing is not excessively deformed so that the characteristics of the seatbelt are impaired in the case of restraint.

The same advantages are offered by an embodiment in which the constriction has a depth of from 1 mm to 3 mm, particularly when the belt reel is provided for webbing having a width of 48 mm.

According to one embodiment, the second axial circumferential circle is disposed concentrically to the rotational axis and/or the constriction is formed to be rotationally symmetrical to the rotational axis. Accordingly, the constriction exhibits the same characteristics in all angular positions of the belt reel, whereby the effect of the constriction is provided independently of the angular position of the belt reel and thus the safety is reliably improved.

According to another embodiment, the constriction in the axial direction has a width of from 10% to 100%, preferably of from 20% to 40%, of the axial length of the reel body. This configuration helps ensure that the webbing can constrict in a defined manner by being guided over a sufficiently large axial area in the constriction.

The constriction may have a concave profile, causing the webbing to be deformed in a way that promotes the path of forces inside the webbing in the case of restraint.

It is advantageous when the constriction is symmetrical, particularly mirror-symmetrical, to a plane, in particular to the axial central plane of the reel body, as in this way the webbing is symmetrically loaded in the axial direction during constriction and, thus, the characteristics improve in the case of restraint.

In another embodiment, between the constriction and adjacent axial portions, the reel body has respective axial transition portions in which the axial circumferential circle steadily changes in the axial direction from the first axial circumferential circle to the second axial circumferential circle. In particular, the axial transition portions are designed to be free of edges. In this way, local load peaks are prevented from forming in the webbing, thereby improving the characteristics in the case of restraint and, consequently, the safety.

In accordance with the invention, for achieving the aforementioned object also a belt retractor comprising a belt reel according to the invention offering the above-mentioned advantages is provided.

BRIEF DESCRIPTION OF THE DRAWINGS

Further advantages and features will be evident from the following description and from the attached drawings, wherein.

DESCRIPTION

Figure 1:
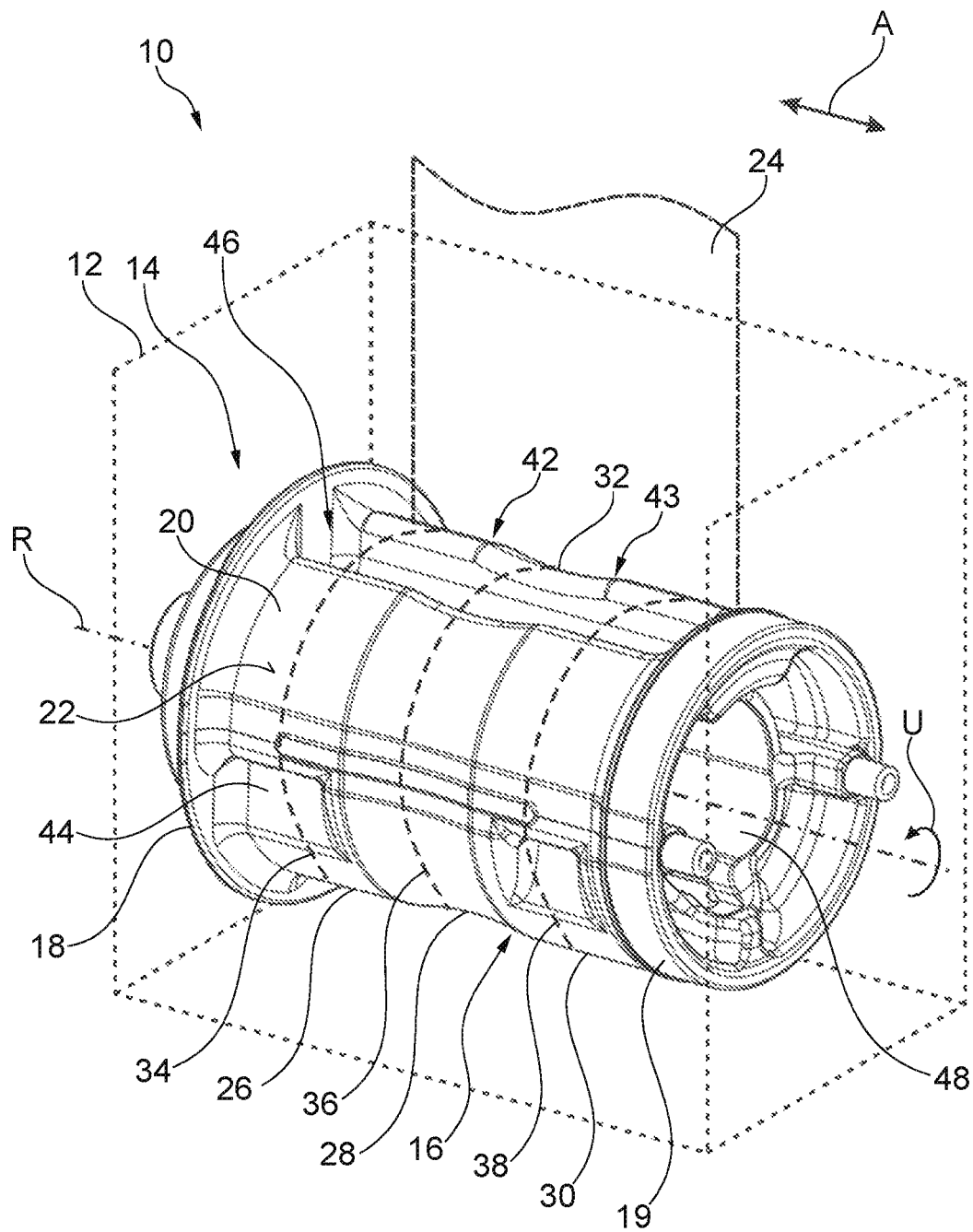
FIG. 1 shows a schematic representation of a belt retractor according to the invention comprising a belt reel according to the invention.

FIG. 1 illustrates a belt retractor 10 comprising a frame 12 and a belt reel 14 which is rotatably supported about the rotational axis R within the frame 12.

The belt retractor 10 is part of a seatbelt system, in particular in a vehicle.

The belt reel 14 includes a reel body 16 as well as axial lateral portions 18, 19 disposed opposed to each other in the axial direction A which delimit the reel body 16 in the axial direction A.

In an alternative embodiment, the belt reel 14 may or may not have an axial lateral portion 18, 19.

The reel body 16 has a circular-cylindrical basic shape and a winding area 20 which is formed by the radial outer face 22 of the reel body 16 and on which a webbing 24 of a seatbelt can be wound and unwound.

In the axial direction A, the reel body 16 includes a first axial portion 26, a second axial portion 28 and a third axial portion 30.

The second axial portion 28 that is disposed in the axial direction A between the first axial portion 26 and the third axial portion 30 includes a radial constriction 32.

The radial constriction 32 is a radial recess extending in the circumferential direction U on the radial outer face 22 of the reel body 16 which forms the winding area 20.

Accordingly, the radial constriction 32 is rotationally symmetrical to the rotational axis R.

Basically, in an alternative embodiment the constriction 32 may be designed substantially at will. In particular, the reel body 16 may have radial recesses and/or radial extensions in the axial portion of the constriction 32.

Figure 3:
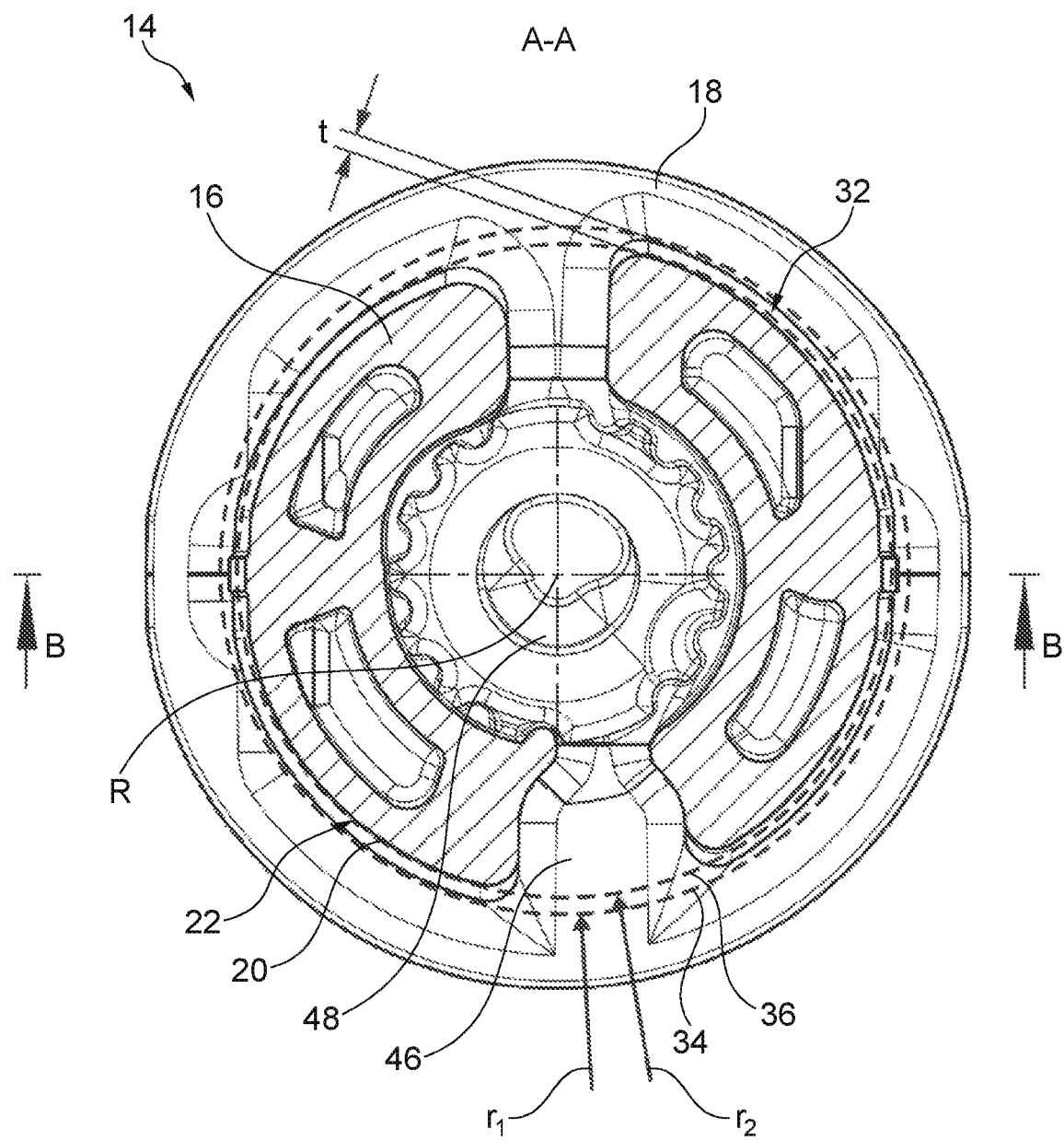
FIG. 3 shows the belt reel of FIG. 1 in a sectional view across the plane A.

The first axial portion 26 has a first axial circumferential circle 34 (see FIG. 3) with a radius r1 and the constriction 32 has a second axial circumferential circle 36 with a radius r2 that is smaller than the radius r1.

Each of the centers of the first circumferential circle 34 and of the second circumferential circle 36 is located on the rotational axis R, thus causing the first circumferential circle 34 and the second circumferential circle 36 to be arranged concentrically to each other.

The third axial portion 30 has a third axial circumferential circle 38 which is designed analogously to the first circumferential circle 34. I.e., the third circumferential circle has a radius r1 and a center that is located on the rotational axis R.

Each of the first and third circumferential circles 34, 38 is the circumferential circle having the largest circumference of the first and, resp., third axial portions 26, 30.

The second circumferential circle 36 is the circumferential circle having the smallest circumference of the second axial portion 28 and the constriction 32.

In an alternative embodiment, each axial portion 26, 28, 30 as well as the constriction 32 may have an individual circumferential circle 34, 36, 38 which may differ from each other, particularly as to their radius and/or the position of their center relative to the rotational axis R.

In addition, or as an alternative, the circumference of the circumferential circle 34, 36, 38 may have any size in the corresponding axial portion 26, 28, 30 and in the constriction 32 relative to further circumferential circles in the corresponding axial portion 26, 28, 30 as well as in the constriction 32.

Preferably, each of the radii of the first circumferential circle 34 and of the third circumferential circle 38 is larger than the radius r2 of the second circumferential circle 36.

The circumference of the second circumferential circle 36 amounts to 90% of the circumference of the first circumferential circle 34.

In an alternative embodiment, the circumference of the second circumferential circle 36 may be from 80% to 95%, preferably from 85% to 90%, of the circumference of the first circumferential circle 34.

Basically, the circumference of the second circumferential circle 36 is allowed to amount to a maximum of 95% of the circumference of the first circumferential circle 34 so that the constriction 32 has a sufficient depth t so that the webbing 24 can appropriately constrict to the smaller diameter, as will be described later.

The depth t corresponds to the difference of the first radius r1 and the second radius r2 and, in the shown embodiment, amounts to 2 mm.

In an alternative embodiment, the depth t of the constriction 32 may be between 1 mm and 3 mm.

The constriction 32 is provided, in the axial direction A, centrally on the reel body 16, i.e., equally distanced from both axial ends of the reel body 16.

Figure 2:
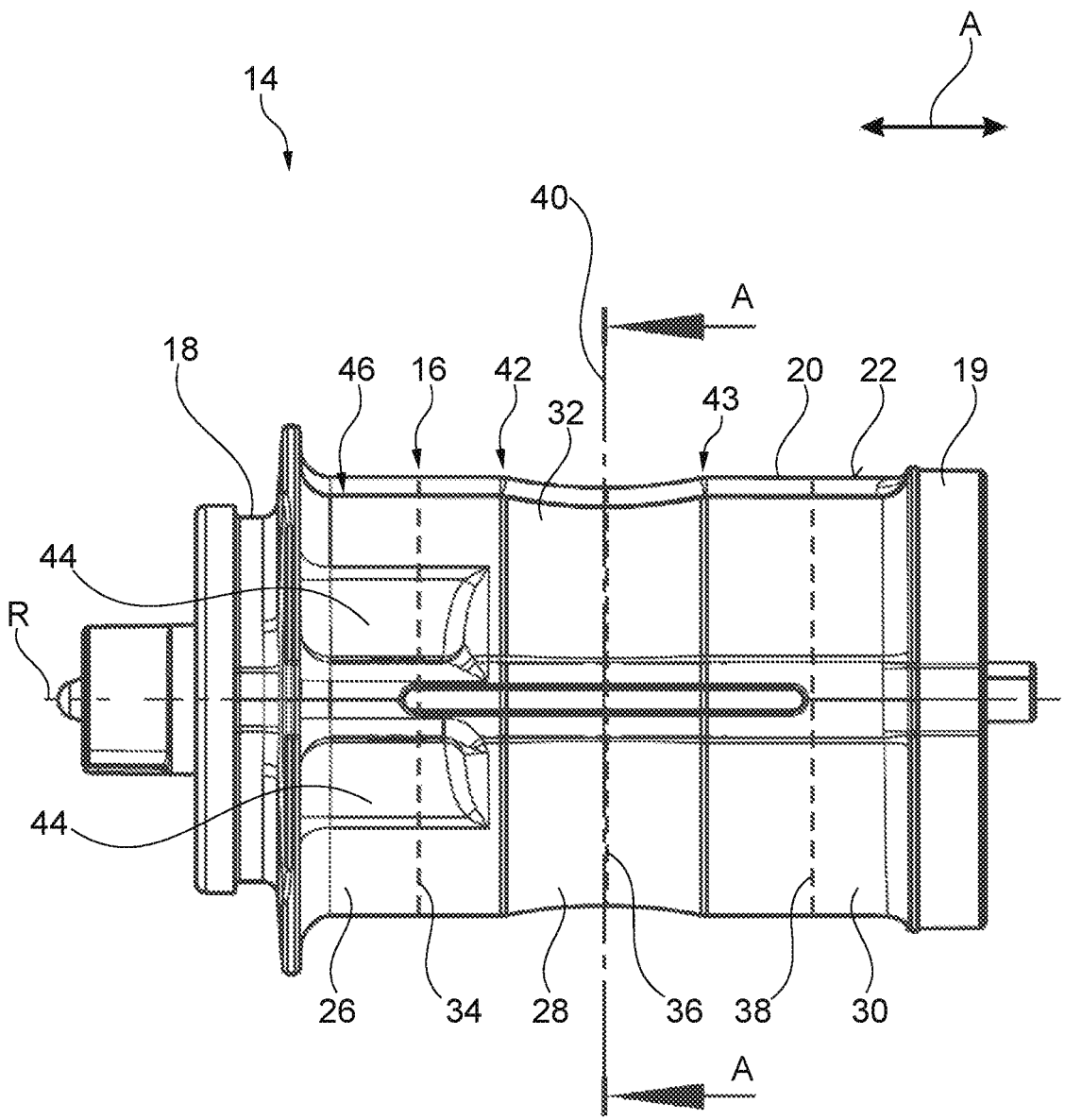
FIG. 2 shows the belt reel of FIG. 1 in a lateral view.

Furthermore, the second circumferential circle 36 is located in the axial central plane 40t which, in FIG. 2, at the same time forms the sectional plane A-A.

Thus, the second circumferential circle 36 is arranged, in the axial direction A, centrally on the reel body 16 as well as centrally on the winding area 20.

Figure 4:
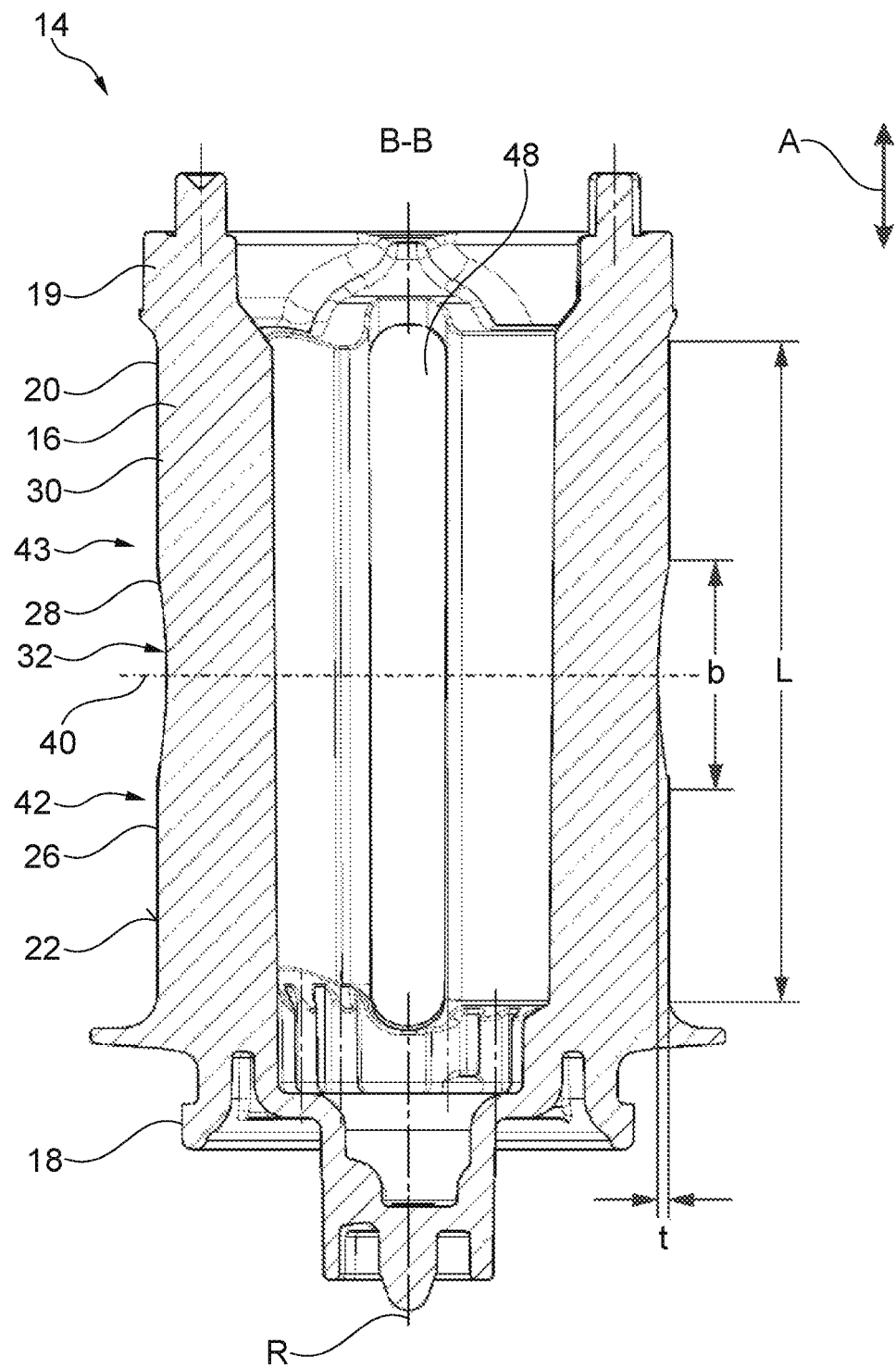
FIG. 4 shows the belt reel of FIG. 1 in a sectional view across the plane B.

The constriction 32 is designed symmetrically to the axial central plane 40 and has a concave profile (see FIG. 4).

The reel body 16 further includes axial transition portions 42, 43 which extend from the second circumferential circle 36 to the first axial portion 26 and, resp., the third axial portion 30 and which are designed so that the radii of the axial circumferential circles in said axial transition portions 42, 43 steadily increase from r2 to r1 in the axial direction A between the second circumferential circle 36 and the first circumferential circle 34 or, resp., the third circumferential circle 38.

The axial transition portions 42, 43 are rounded and, thus, are free of edges so as to provide an advantageous transmission of the loads from the winding area 20 to the webbing 24 in the case of restraint.

Basically, the reel body 16 may have a profile of any course.

The constriction 32 has a width b in the axial direction A (see FIG. 4) which amounts to 30% of the axial length L of the reel body 16.

In the present embodiment, in which the belt reel 14 is provided for a webbing 24 having a width of 48 mm, the length L of the reel body 16 amounts to 50 mm and the width b of the constriction 32 amounts to 15 mm.

In an alternative embodiment, the width b of the constriction 32 may be between 10% and 100%, in particular between 20% and 40% of the axial length L of the reel body 16.

This means particularly that, according to an alternative embodiment, the constriction 32 may extend over the entire axial length L of the reel body 16.

Accordingly, the axial length L of the reel body 16 at the same time corresponds to the axial length of the winding area 20.

The reel body 16 further includes mounting pockets 44 and an axial gap 46 dividing the reel body 16 which interrupt the winding area 20.

In an alternative embodiment, the reel body 16 may have no or any number of geometrical elements such as pockets, gaps and/or projections.

In addition, or as an alternative, the reel body 16 may have any basic shape.

In particular, the reel body 16 may include, in the circumferential direction, a radial step to which one end of the webbing 24 is fastened so that, at the step, the webbing 24 merges tangentially into the second winding.

Moreover, the belt reel 14 includes a cavity 48 extending along the rotational axis R (see FIG. 4) in which a rod-shaped or tubular load-limiting element that is part of a load limiter of the belt retractor 10 can be disposed.

The belt retractor 10 can basically include any load-limiting elements. This means that the belt reel 14 is compatible with the common load limiters and can be used, jointly with the latter, in a belt retractor 10.

If the webbing 24 is loaded in the case of restraint, for example in the case of crash, the constriction 32 results in the webbing 24 being partially wound on the reel body 16 constricting at least partially to the smaller diameter of the second circumferential circle 36. Said constricting causes the acting lever to decrease, in particular to the radius r2, and consequently the acting forces of the webbing 24 being reduced to the belt reel 14.

This effect is additionally promoted by the afore-described geometrical design of the reel body 16 and the constriction 32.

In this way, a belt reel 14 is provided which results in a reduction of the forward displacement in the sled test according to ECE R16 and in a reduction of the webbing extension in the loop load test according to FMVSS 209.

The belt reel thus exhibits improved characteristics in the case of restraint, thereby improving the safety of a vehicle occupant who is protected by a safety system in such belt reel.

The invention is not limited to the shown embodiment. In particular, individual features of one embodiment can be combined at will with features of other embodiments, particularly independently of the other features of the respective embodiments.

The invention claimed is:

1. A belt reel (14) for a belt retractor (10), comprising a rotational axis (R) and a reel body (16) which has a first axial circumferential circle (34), wherein the reel body (16) is configured to be connected directly to the webbing (24) so that the webbing (24) is directly wound on and unwound from the reel body (16), wherein the reel body (16) includes a radial constriction (32) having a second axial circumferential circle (36), wherein the constriction (32) is arranged centrally on the reel body (16) in the axial direction (A) such that the constriction (32) is equally distanced from both axial ends of the reel body (16), and wherein the circumference of the second axial circumferential circle (36) amounts to a maximum of 95% of the circumference of the first axial circumferential circle (34).

2. The belt reel according to claim 1, wherein the second axial circumferential circle (36) is arranged centrally on the reel body (16) in the axial direction (A) such that the second axial circumferential circle (36) is equally distanced from both axial ends of the reel body (16).

3. The belt reel according to claim 1, wherein the circumference of the second axial circumferential circle (36) amounts to 80% to 95% of the circumference of the first axial circumferential circle (34).

4. The belt reel according to claim 1, wherein the constriction (32) has a depth (t) between 1 mm and 3 mm.

5. The belt reel according to claim 1, wherein the second axial circumferential circle (36) is arranged concentrically to the rotational axis (R), and/or the constriction (32) is formed to be rotationally symmetrical to the rotational axis (R).

6. The belt reel according to claim 1, wherein in the axial direction (A) the constriction (32) has a width (b) of from 10% to 100% of the axial length (L) of the reel body (16).

7. The belt reel according to claim 1, wherein the constriction (32) has a concave profile.

8. The belt reel according to claim 1, wherein the constriction (32) is designed to be symmetrical to an axial central plane (40) of the reel body (16).

9. The belt reel according to claim 1, wherein, between the constriction (32) and adjacent axial portions (26, 28, 30), the reel body (16) includes respective axial transition portions (42, 43) in which the axial circumferential circle changes in the axial direction (A) from the first axial circumferential circle (34) to the second axial circumferential circle (36).

10. A belt retractor (10) comprising a belt reel (14) according to claim 1.

11. A seatbelt system for a vehicle, the seatbelt system comprising:
a belt retractor (10) having the belt reel (14) according to claim 1; and
a webbing (24) directly connected to the reel body (16) so as to be directly wound on and unwound from the reel body (16), the webbing (24) constricting at least partially to the smaller diameter of the second circumferential circle (36) when a load on the webbing (24) reaches a predefined load level.

12. The seatbelt system according to claim 11, wherein the constriction (32) defines a constricting space that projects radially into the reel body (16), a portion of the webbing (24) being radially adjacent to the constriction (32) and the constricting space when the webbing (24) is wound on the reel body (16), the radially adjacent portion of the webbing (24) being external to the constricting space when the load on the webbing (24) is below the predefined load level, the radially adjacent portion of the webbing (24) protruding into the constricting space when the load on the webbing (24) reaches the predefined load level and the webbing (24) constricts at least partially to the smaller diameter of the second circumferential circle (36).

13. The seatbelt system according to claim 12, wherein the reel body (16) includes a first axial portion (26) having the first axial circumferential circle (34) and a uniform diameter, a second axial portion (28) having the constriction (32) and the second axial circumferential circle (36), and a third axial portion (30) having a third axial circumferential circle (38) and a uniform diameter, the third axial circumferential circle (38) being equal to the first axial circumferential circle (34), the diameters of the first and third axial portions (26, 30) being equal to one another, the second axial portion (28) being axially between the first and third axial portions (26, 30), and wherein the webbing (24) includes an axial end portion on both axial sides of the portion of the webbing (24) that is radially adjacent to the constriction (32), each axial end portion of the webbing (24) directly contacting one of the first and third axial portions (26, 30) of the reel body (16) when the webbing (24) is wound on the reel body (16).

14. The belt reel according to claim 1, wherein the reel body (16) includes a first axial portion (26) having the first axial circumferential circle (34) and a uniform first diameter, a second axial portion (28) having the constriction (32) and the second axial circumferential circle (36), and a third axial portion (30) having a third axial circumferential circle (38) and a uniform diameter, the third axial circumferential circle (38) being equal to the first axial circumferential circle (34), the diameters of the first and third axial portions (26) being equal to one another, the second axial portion (28) being axially between the first and third axial portions (26, 30).

15. The belt reel according to claim 14, wherein an axial transition portion (42, 43) is between the second axial portion (28) and each of the first and third axial portions (26, 30), the diameter of the reel body (16) continuously changing along the axial length of each of the axial transition portions.

16. The belt reel according to claim 14, wherein an axial length of each of the first and third axial portions (26) is 30% to 40% of the axial length (L) of the reel body (16), an axial length (b) of the second axial portion being 20% to 40% of the axial length (L) of the reel body (16).

17. The belt reel according to claim 1, wherein an axial gap (46) in the reel body (16) divides the reel body (16) into two halves.

18. The belt reel according to claim 6, wherein in the axial direction (A), the constriction (32) has a width (b) of from 20% to 40% of the axial length (L) of the reel body (16).

19. The belt reel according to claim 9, wherein the axial transition portions (42, 43) are free of edges.

20. The belt reel according to claim 9, wherein the axial circumferential circle continuously changes in the axial direction (A) from the first axial circumferential circle (34) to the second axial circumferential circle (36).

* * * * *